US006715507B2

(12) United States Patent
Arai et al.

(10) Patent No.: US 6,715,507 B2
(45) Date of Patent: Apr. 6, 2004

(54) VAPORIZER

(75) Inventors: Mayumi Arai, Tokyo (JP); Yoshiyuki Yamazaki, Tokyo (JP)

(73) Assignee: MKS Japan, Inc., Tokyo (JP)

( * ) Notice: Subject to any disclaimer, the term of this patent is extended or adjusted under 35 U.S.C. 154(b) by 0 days.

(21) Appl. No.: 10/364,357

(22) Filed: Feb. 12, 2003

(65) Prior Publication Data

US 2003/0140965 A1 Jul. 31, 2003

Related U.S. Application Data

(62) Division of application No. 09/533,439, filed on Mar. 23, 2000, now Pat. No. 6,581,625.

(30) Foreign Application Priority Data

Mar. 24, 1999 (JP) ............................................ 11-79380

(51) Int. Cl.[7] ......................... F16K 51/00; F16K 49/00; B08B 9/032

(52) U.S. Cl. ....................... 137/240; 134/902; 137/238; 137/341; 392/399

(58) Field of Search ................................ 137/240, 341, 137/238; 122/40, 41; 392/394, 399, 485; 134/1.3, 902

(56) References Cited

U.S. PATENT DOCUMENTS 4,869,301 A 9/1989 Ohmi et al.
5,014,727 A 5/1991 Aigo
5,137,047 A 8/1992 George
5,249,624 A * 10/1993 Pow et al. .................. 392/399
5,313,982 A 5/1994 Ohmi et al.
5,336,356 A 8/1994 Ban et al.
5,361,800 A 11/1994 Ewing
5,371,828 A 12/1994 Ewing
5,437,542 A 8/1995 Ewing
5,440,887 A 8/1995 Nishizato et al.
5,455,014 A 10/1995 Costantino et al.
5,488,967 A 2/1996 Minami et al.
5,520,205 A 5/1996 Guldi et al.
5,553,188 A 9/1996 Ewing
5,660,207 A 8/1997 Mudd
5,800,626 A 9/1998 Cohen et al.
5,819,782 A 10/1998 Itafuji
5,826,607 A 10/1998 Knutson et al.
5,835,677 A 11/1998 Li et al.
5,849,091 A 12/1998 Skrovan et al.
5,868,159 A 2/1999 Loan et al.
5,966,499 A 10/1999 Hinkle et al.
6,006,765 A 12/1999 Skrovan et al.
6,019,114 A 2/2000 Rodgers
6,065,481 A 5/2000 Fayfield et al.
6,068,016 A 5/2000 Manofsky, Jr. et al.
6,132,515 A 10/2000 Gauthier
6,216,708 B1 4/2001 Agarwal
6,244,575 B1 6/2001 Vaartstra et al.

* cited by examiner

*Primary Examiner*—George L. Walton
(74) *Attorney, Agent, or Firm*—Wenderoth, Lind & Ponack, L.L.P.

(57) ABSTRACT

A vaporizer comprises disks each including an aperture at a central portion thereof. A hollow pipe having apertures for permitting radial outflow of a liquid extends through the aperture of each of the discs so as to form a stack of the discs. A resilient member applies a biasing force to the discs, and structure applies a force, via fluid control, against the biasing force to thereby remove the biasing force from the discs. Liquid in the hollow pipe is adapted to be delivered from the apertures to spaces between the discs and vaporized in the spaces between the discs.

2 Claims, 4 Drawing Sheets

VAPORIZER

CROSS REFERENCE TO A RELATED APPLICATION

This application is a division application to U.S. application, Ser. No. 09/533,439, entitiled, "Liquid Supply System, Method For Cleaning the Same and Vaporizer", filed Mar. 23, 2000, now U.S. Pat. No. 6,581,625 B1, which is entirely incorporated herein by reference.

BACKGROUND OF THE INVENTION

The present invention relates to a liquid supply system which can be used in a process for manufacturing semiconductors and a method for cleaning the liquid supply system. The present invention is also concerned with a vaporizer used in the liquid supply system.

In recent years, with respect to a process for manufacturing semiconductors, DLI (Direct Liquid Injection) for vaporizing a solution of a solid dissolved in a solvent and supplying the resultant vapor to a system has attracted attention. As a system conducting DLI for supply of a liquid, there can be mentioned the systems disclosed in an article written by the present inventor titled "Direct Liquid Injection System" in "Keisoku Gijyutsu (Measurement Technology)" Vol. 25, No. 12 (January, 1997) published by JAPAN INDUSTRIAL PUBLISHING CO., LTD., Unexamined Japanese Patent Application Public Disclosure (Kokai) No. 5-253402 and U.S. Pat. Nos. 5,361,800 and 5,371,828.

However, due to the supply of liquid by DLI, the above-mentioned systems have problems such as mentioned below. That is, after a certain period of time during use, a solid remains in the system or the state of a solution of the solid dissolved in a solvent changes, thereby adversely affecting the process. Further, with respect to a liquid containing no solid dissolved therein, there is a possibility that a solid component will be produced by thermal decomposition and remain in the system.

SUMMARY OF THE INVENTION

In order to solve the above-mentioned problems accompanying the conventional liquid supply systems, the present invention has been made. It is an object of the present invention to provide a liquid supply system by use of which an appropriate time for maintenance can be estimated and the state of a supply liquid can be detected. It is another object of the present invention to provide a liquid supply system which enables appropriate maintenance and a method for cleaning the liquid supply system. It is a further object of the present invention to provide a vaporizer used in the liquid supply system.

According to the present invention, there is provided a liquid supply system comprising:

- a first pump for delivering a liquid under high pressure;
- a vaporizer for vaporizing the liquid delivered from the first pump to thereby obtain vapor, the vapor being adapted to be introduced into a reaction chamber; and
- a passage extending from the first pump to the vaporizer, wherein a pressure gage is provided in the passage and a monitor device is provided so as to indicate a pressure, based on an output of the pressure gage.

By this arrangement, the pressure in the passage from the first pump to the vaporizer is monitored so as to estimate the amount of decomposition products accumulated in the vaporizer. Therefore, it is possible to estimate the time for cleaning or the time for maintenance.

The present invention also provides a liquid supply system comprising:

- a first pump for delivering a liquid under high pressure;
- a vaporizer for vaporizing the liquid delivered from the first pump to thereby obtain vapor, the vapor being adapted to be introduced into a reaction chamber; and
- a passage extending from the first pump to the vaporizer,
- wherein a liquid flowmeter is provided in the passage and a monitor device is provided so as to indicate a flow rate, based on an output of the liquid flowmeter.

By this arrangement, the flow rate of the fluid in the passage from the first pump to the vaporizer is monitored, to thereby enable detection of clogging of the vaporizer or a defect in the pump.

The present invention further provides a liquid supply system comprising:

- a first pump for delivering a liquid under high pressure; and
- a vaporizer for vaporizing the liquid delivered from the first pump to thereby obtain vapor, the vapor being adapted to be introduced into a reaction chamber,
- wherein the liquid supply system further comprises:
  - a solvent supply system for supplying a solvent for cleaning or a cleaning liquid, the solvent supply system including a second pump for delivering the solvent or the cleaning liquid under high pressure;
  - a gas supply system for introducing a gas into the first pump and the vaporizer, the gas supply system including a flow rate controller;
  - a passage for introducing the solvent or the cleaning liquid from the solvent supply system into the first pump and the vaporizer so that the first pump and the vaporizer fill with the solvent or the cleaning liquid; and
  - a passage for introducing the gas from the gas supply system into the first pump and the vaporizer.

By this arrangement, the system can be cleaned by filling the first pump and the vaporizer with the solvent or the cleaning liquid and introducing the gas into the first pump and the vaporizer through the flow rate controller.

The present invention further provides a method for cleaning a liquid supply system, the liquid supply system comprising a first pump for delivering a liquid under high pressure and a vaporizer for vaporizing the liquid delivered from the first pump to thereby obtain vapor, the vapor being adapted to be introduced into a reaction chamber, the method comprising the steps of:

- introducing a solvent or a cleaning liquid into the first pump and the vaporizer so that the first pump and the vaporizer fill with the solvent or the cleaning liquid; and introducing a gas into the first pump and the vaporizer through a flow rate controller.

By this arrangement, cleaning can be conducted by introducing bubbles into the solvent or the cleaning liquid.

The present invention further provides a vaporizer comprising:

- a plurality of disks each including an aperture at a central portion thereof;
- a pipe having a hollow structure and having apertures for permitting radial outflow of a liquid, the pipe extending through the aperture of each disk so as to form a stack of the disks; and
- a resilient member for applying a biasing force so as to bias the plurality of disks,
- the liquid in the pipe being adapted to be delivered from the apertures to spaces between the disks and vaporized in the spaces between the disks, wherein the vaporizer further comprises structure for removing the bias of the resilient member relative to the plurality of disks by applying a force against the biasing force by virtue of fluid control.

By this arrangement, the space between the disks can be increased, so that cleaning can be effectively conducted. The foregoing and other objects, features and advantages of the present invention will be apparent from the following detailed description and appended claims taken in connection with the accompanying drawings.

DETAILED DESCRIPTION OF THE INVENTION

Figure 1:
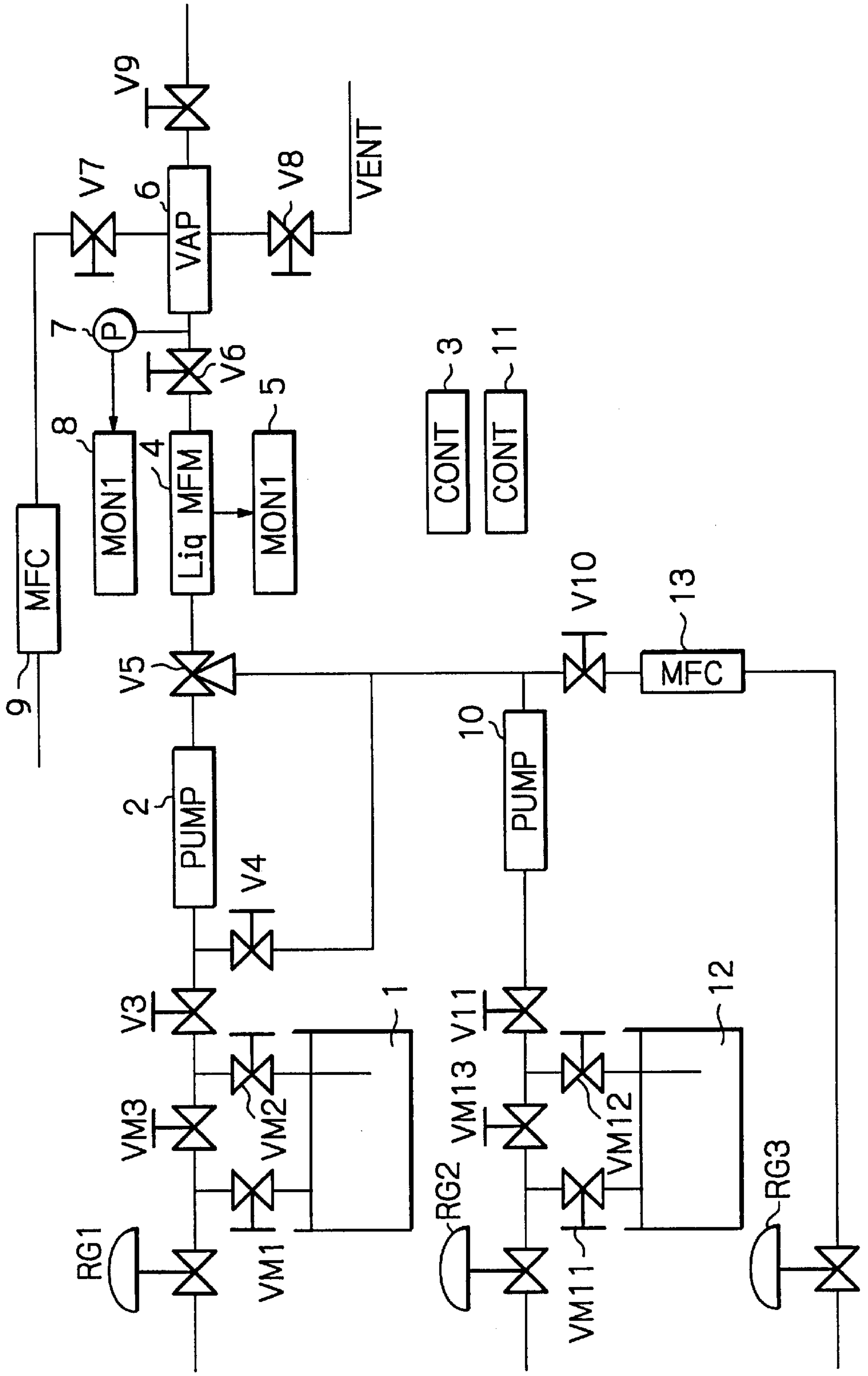
FIG. 1 shows an arrangement of a liquid supply system according to an embodiment of the present invention.

Hereinbelow, referring to the drawings, explanation is made of a liquid supply system, a method for cleaning the liquid supply system and a vaporizer used in the liquid supply system, according to the present invention. In the drawings, the same elements are designated by the same reference numerals and characters, and overlapping explanation is omitted. FIG. 1 shows an arrangement of a liquid supply system, according to an embodiment of the present invention. In this system, a liquid to be vaporized and supplied to a reaction chamber is stored in a reservoir 1. Valves VM1 to VM3 are connected to the reservoir 1. The valves VM1 to VM3 are opened and closed appropriately according to the condition of the reservoir 1. When the reservoir 1 is in a condition for use, the valves VM1 and VM2 are open while the valve VM3 is closed. A regulator RG1 is connected to the inlet side of the valves VM1 and VM3. High-pressure air supplied from an air supply source (not shown) is adjusted to a predetermined pressure by the regulator RG1 and is supplied through the valve VM1 to the reservoir 1.

A valve V3 is connected to the outlet side of the valves VM2 and VM3 and a pump 2 is connected to the outlet of the valve V3. As the pump 2, use is made of a pump disclosed in each of the above-mentioned documents, that is, the article written by the present inventor [titled "Direct Liquid Injection System" in "Keisoku Gijyutsu (Measurement Technology)" Vol. 25, No. 12 (January, 1997) published by JAPAN INDUSTRIAL PUBLISHING CO., LTD.], Kokai No. 5-253402 and U.S. Pat. Nos. 5,361,800 and 5,371,828. The pump 2 is controlled by a controller 3 and delivers the liquid under high pressure.

A liquid flowmeter 4 is connected to the delivery side of the pump 2 through a three-way valve V5. As the liquid flowmeter 4, a flowmeter called a flow monitor manufactured and sold by MKS, JAPAN, INC. can be used. As the liquid flowmeter 4, a liquid flowmeter having the same mechanism as a flow rate detector of a type having no liquid-contact portion (having no portion which makes contact with a liquid) can be used. Such a liquid flowmeter is disclosed in U.S. Pat. No. 5,741,968 for an invention of the present inventor. An output of the liquid flowmeter 4 is supplied to a monitor device 5 which in turn indicates a flow rate of the liquid, based on the output of the liquid 25 flowmeter 4.

A vaporizer 6 is connected through a valve V6 to the outlet of the liquid flowmeter 4. The inlet side of the vaporizer 6 is connected to a pressure gage 7 for detecting a pressure of the liquid in a passage from the pump 2 to the vaporizer 6. As the pressure gage 7, for example, a strain gage can be used. An output of the pressure gage 7 is supplied to a monitor device 8 which in turn indicates the liquid pressure, based on an output of the pressure gage 7. As the vaporizer 6, a vaporizer disclosed in each of the above-mentioned documents [the article written by the present inventor titled "Direct Liquid Injection System" in "Keisoku Gijyutsu (Measurement Technology)" Vol. 25, No. 12 10 (January, 1997) published by JAPAN INDUSTRIAL PUBLISHING CO., LTD., Kokai No. 5-253402 and U.S. Pat. Nos. 5,361,800 and 5,371,828] may be used. However, the vaporizer 6 in this embodiment has an arrangement such as shown in FIG. 2.

Figure 2:
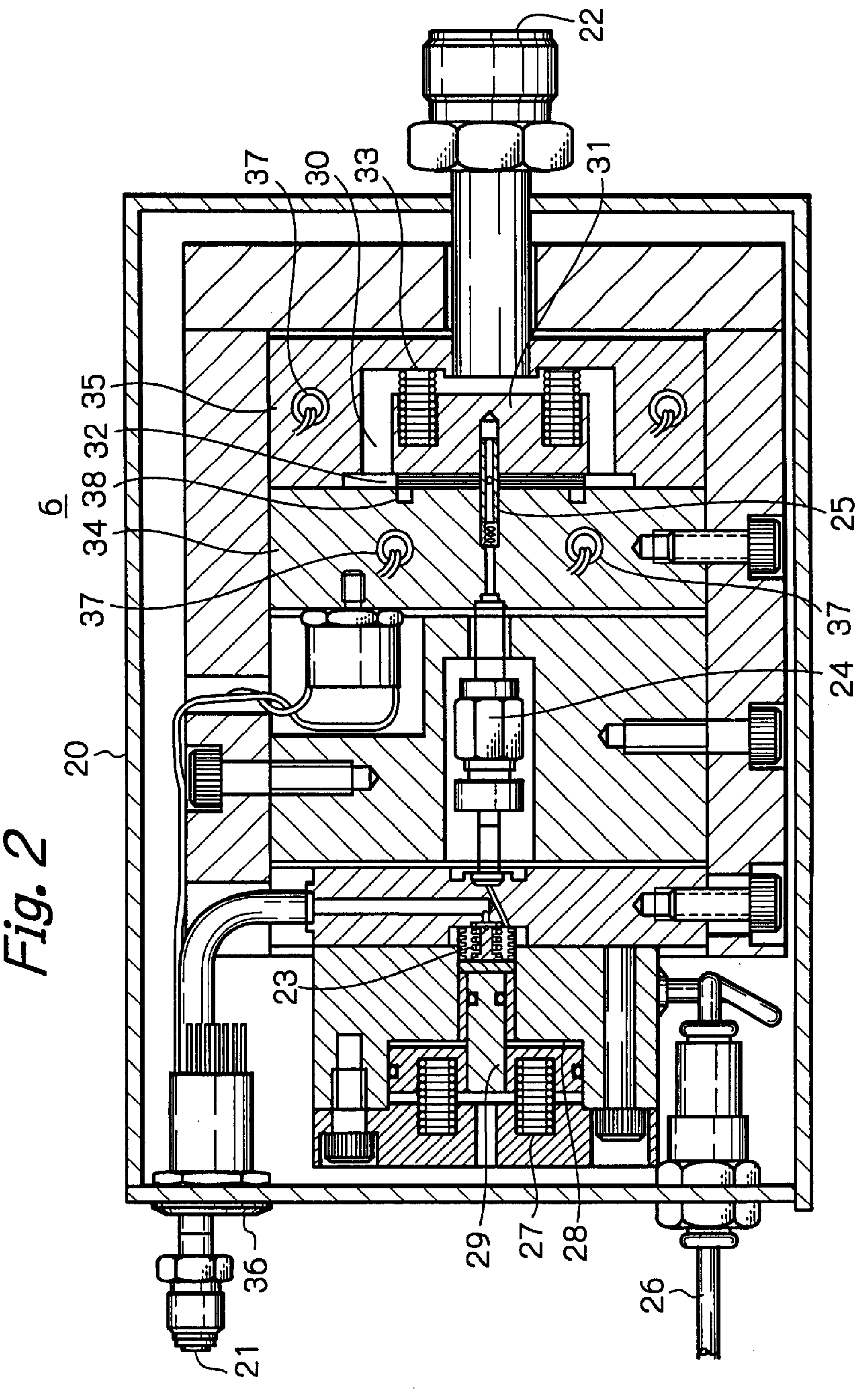
FIG. 2 shows an arrangement of a vaporizer used in the liquid supply system according to the embodiment of the present invention.

In the vaporizer 6 in FIG. 2, the liquid is introduced from an inlet 21 into a casing 20 and vaporized. The resultant vapor is supplied from an outlet 22 to a reaction chamber. The liquid from the inlet 21 flows through a flow passage extending from a one-way valve 23 through a connecting portion 24 to a pipe 25 having a hollow structure. The pipe 25 includes apertures for permitting radial outflow of the liquid.

The one-way valve 23 is opened by supplying air from an air supply passage 26 to a gap 28. Under pressure of the supplied air, a cylinder 29 is moved against a biasing force of a spring 27 in a direction for opening an orifice in the one-way valve 23.

The pipe 25 is provided within a fit block 31 in a vaporizing chamber 30. The pipe 25 extends through the center apertures of a plurality of disks 32, so as to form a stack of the disks 32. The disks 32 are the same as the disks shown in FIG. 3 in the above-mentioned article written by the present inventor [titled "Direct Liquid Injection System" in "Keisoku Gijyutsu (Measurement Technology)" Vol. 25, No.12 (January, 1997) published by JAPAN INDUSTRIAL PUBLISHING CO., LTD.].

The fit block 31 is biased toward the disks 32 by a spring 33, to thereby maintain extremely narrow spaces between the disks. Base blocks 34 and 35 are disposed so as to surround the vaporizing chamber 30. Heaters 37 which generate heat by receiving electric power supplied from a connector 36 are provided in the base blocks 34 and 35. When the heaters 37 generate heat, the base blocks 34 and 35 are heated and the disks 32 are also heated. Consequently the liquid in the pipe 25 is forced through the apertures of the pipe 25 into the spaces between the disks 32 and the liquid is vaporized in the spaces between the disks 32. The resultant vapor is supplied from the vaporizing chamber 30 through the outlet 22 to the reaction chamber. The outlet 22 is connected to a valve V9 shown in FIG. 1. Therefore, the vapor is supplied through the valve V9 to the reaction chamber.

The vaporizer 6 is adapted to receive a diluting gas. The diluting gas is introduced into a cavity 38 formed in the base block 34. The diluting gas is supplied to the vaporizer 6 through a flow rate control device 9 and a valve V7 shown in FIG. 1. Further, the vapor can be vented through the cavity 38 formed in the base block 34. In FIG. 1, the vapor is vented for disposal through a valve V8.

The three-way valve V5 is connected to a pump 10 and a valve V10. The pump 10 has the same structure as the pump 2 and is controlled by a controller 11 so as to deliver a liquid under high pressure. A solvent for cleaning or a cleaning liquid, which is to be supplied to the pump 2 and the vaporizer 6, is stored in a reservoir 12.

Valves VM11 to VM13 are connected to the reservoir 12. The valves VM11 to VM13 are opened and closed appropriately according to the condition of the reservoir 12. When the reservoir 12 is in a condition for use, the. valves VM11 and VM12 are open while the valve VM13 is closed. A regulator RG2 is connected to the inlet side of the valves VM11 and 15 VM13. High-pressure air from the air supply source (not shown) is adjusted to a predetermined pressure by the regulator RG2 and supplied through the valve VM11 to the reservoir 12. A valve V11 is connected to the outlet side of the valves VM12 and VM13. The pump 10 is connected to the outlet of the valve V11. The line from the air supply source to the inlet of the pump 10 provides a solvent supply system for supplying the solvent for cleaning or the cleaning liquid.

A flow rate control device 13 is connected to the valve V10. High-pressure air from the air supply source (not shown) is adjusted to a predetermined pressure by a regulator RG3 and supplied to the flow rate control device 13. The line from the air supply source to the flow rate control device 13 provides a gas supply system.

In the liquid supply system arranged as mentioned above, in a normal operative state, a valve V4 and the valves V10 and V11 are closed, so that the solvent supply system and the gas supply system are not involved in an operation of the liquid supply system. In this state, the liquid from the reservoir 1 is pressurized and delivered to the vaporizer 6 by the pump 2. The liquid is vaporized in the vaporizer 6, and the resultant vapor is supplied to the 10 reaction chamber.

The output of the liquid flowmeter 4 is supplied to the monitor device 5. The monitor device 5 indicates the flow rate of the liquid, based on the output of the liquid flowmeter 4. By monitoring the flow rate in the passage from the pump 2 to the vaporizer 6 by the monitor device 5, it is possible to detect clogging of the vaporizer 6 or a defect in the pump 2. That is, when the flow rate lowers during normal operation of the system, it is considered that the flow rate lowers due to clogging of the vaporizer 6 or that an appropriate flow rate cannot be obtained due to a defect in the pump 2. In this case, a countermeasure can be taken by inspecting the pump 2 and the vaporizer 6 and effecting appropriate maintenance such as cleaning.

Figure 3:
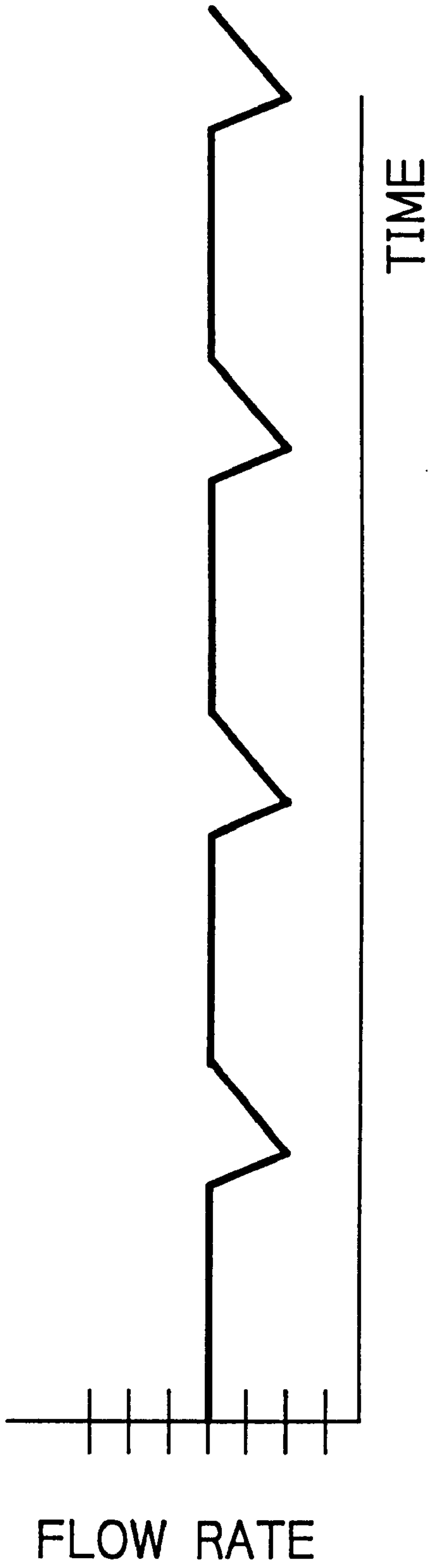
FIG. 3 shows a monitor display indicating a flow rate in the liquid supply system according to the embodiment of the present invention.

As the monitor device 5, it is preferred to use a device capable of indicating a variation in flow rate with time, because such device enables detection of a pulsating flow due to a change in viscosity of the liquid and therefore enables detection of deterioration of the liquid. For example, as the monitor device 5, use is made of a device capable of indicating a graph such as shown in FIG. 3 in which the abscissa indicates the time and the ordinate indicates the flow rate. In this arrangement, when it is observed that lowering of the flow rate occurs at certain time intervals as shown in FIG. 3, it is considered that the viscosity of the liquid is high due to evaporation of a solvent in the liquid, dissociation of a solute in the liquid or deterioration a countermeasure can be the system and conducting, liquid in the reservoir 2. rate in FIG. 3 corresponds stroke for delivery of one start of a stroke for delivery of the other piston in the pump 2. The monitor 5 should indicate data corresponding to a sufficient time to determine the cycle of lowering of the flow rate.

Further, by monitoring the liquid pressure in the passage from the pump 2 to the vaporizer 6 by the monitor device 8, the amount of decomposition products accumulated in the vaporizer 6 can be estimated so as to determine an appropriate time for cleaning or maintenance. That is, when the liquid pressure becomes high during normal operation, accumulation of decomposition products in the vaporizer 6 can be expected, so that a countermeasure such as cleaning or maintenance can be taken.

For cleaning the liquid supply system, the system is stopped, and the valve V3 is closed and the valves V4 and V11 are opened. Consequently, the solvent or the cleaning liquid is introduced through the pump 10 into the pump 2 and the vaporizer 6, to thereby fill the pump 2 and the vaporizer 6 with the solvent or the cleaning liquid. Subsequently, the valve V11 is closed and the valve V10 is opened, so that air is introduced through the flow rate control device 13 into the pump 2 and the vaporizer 6, to 10 thereby conduct cleaning. By this arrangement, the liquid supply system can be cleaned by introducing bubbles into the solvent or the cleaning liquid filling the pump 2 and the vaporizer 6. Therefore, cleaning can be conducted vigorously as compared to cleaning simply by using the solvent or the cleaning liquid, so that cleaning can be effectively conducted.

Figure 4:
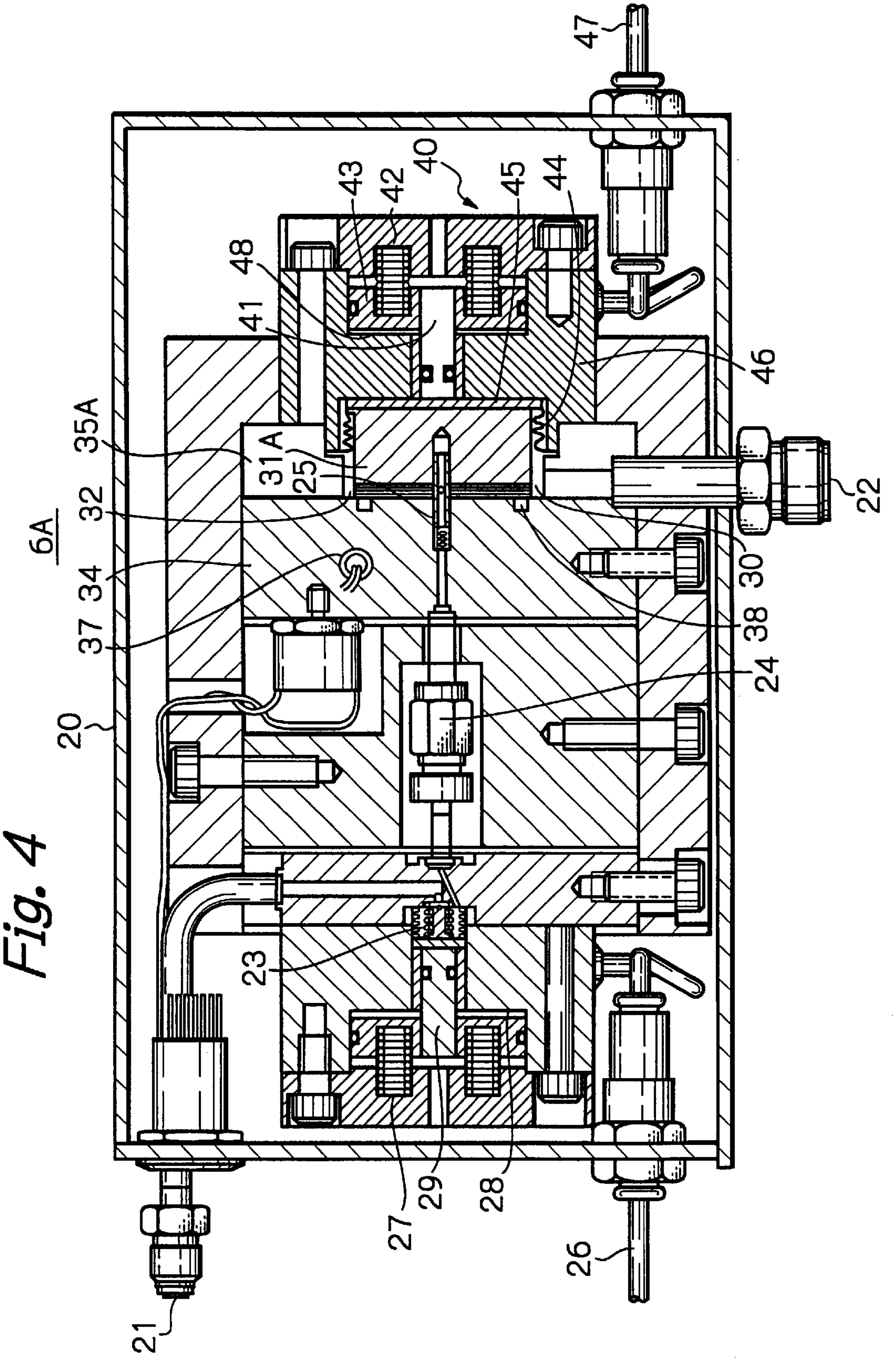
FIG. 4 shows an arrangement of a vaporizer used in a liquid supply system according to another embodiment of the present invention.

In the present invention, a vaporizer 6A such as shown in FIG. 4 may be used. The vaporizer 6A enables more effective cleaning than the vaporizer 6. In the vaporizer 6A, the arrangement for biasing the disks 32 differs from that in the vaporizer 6. In a bias portion 40, a block 43 is biased toward the disks 32 by a spring 42. The outlet 22 faces in a radial direction relative to the disks 32.

No spring is provided within a fit block 31A in the vaporizing chamber 30. A portion protruding from a block 46 is received in a stepped portion of a base block 35A surrounding the vaporizing chamber 30. A bellows 44 is provided in the protruding portion of the block 46. A platy portion 45 is connected to the bellows 44. The platy portion 45 is pressed by a cylinder 41 connected to the block 43 which is biased by the spring 42, so that the fit block 31A is biased toward the disks 32 by the spring 42, to thereby maintain extremely narrow spaces between the disks.

For removing the bias of the spring 42, air is supplied from an air supply passage 47 to a gap 48. The block 43 and the cylinder 41 are moved toward the spring 42 under pressure of the supplied air, against the biasing force of the spring 42.

In the vaporizer 6A arranged as mentioned above, normally, the fit block 31A is biased toward the disks 32 by the spring 42, to thereby maintain extremely narrow spaces between the disks. In this state, as in the case of the vaporizer 6, the liquid is vaporized between the spaces between the disks, and the resultant vapor is supplied from the vaporizing chamber 30 through the outlet 22 to the reaction chamber.

For cleaning the liquid supply system, before the above-mentioned operation for cleaning, air is supplied from the air supply passage 47 into the vaporizer 6A. The air is supplied to the gap 48 and the gap 48 is expanded under pressure of the supplied air. Consequently, the block 43 and the cylinder 41 move against the biasing force of the spring 42, to thereby expand the spaces between the disks. In this state, the vaporizer 6A is filled with the solvent or the cleaning liquid and air is introduced into the solvent or the cleaning liquid in a manner such as mentioned above, to thereby conduct cleaning.

Thus, in the vaporizer 6A, cleaning is conducted by introducing bubbles into the solvent or the cleaning liquid while the spaces between the disks 32 are expanded. Therefore, cleaning of the disks 32 can be effectively conducted.

As has been described above, in the liquid supply system of the present invention, the pressure in the passage extending from the first pump to the vaporizer can be monitored so as to estimate the amount of decomposition products accumulated in the vaporizer. Therefore, it is possible to estimate the time for cleaning or the time for maintenance.

Further, in the liquid supply system of the present invention, the flow rate of the fluid in the passage extending from the first pump to the vaporizer is monitored, so that clogging of the vaporizer or a defect in the pump can be detected.

In the liquid supply system of the present invention comprising: a solvent supply system including a second pump for delivering a solvent or a cleaning liquid under high pressure; a gas supply system including a flow rate controller for introducing a gas into the first pump and the vaporizer; a passage for introducing the solvent or the cleaning liquid from the solvent supply system into the first pump and the vaporizer so that the first pump and the vaporizer fill with the solvent or the cleaning liquid; and a passage for introducing the gas from the gas supply system into the first pump and the vaporizer, the system can be cleaned by filling the first pump and the vaporizer with the solvent or the cleaning liquid and introducing the gas into the first pump and the vaporizer through the flow rate controller.

In the method for cleaning the liquid supply system according to the present invention, cleaning is conducted by introducing a solvent or a cleaning liquid into the first pump and the vaporizer so that the first pump and the vaporizer fill with the solvent or the cleaning liquid and introducing a gas into the first pump and the vaporizer through a flow rate controller. Therefore, cleaning can be conducted vigorously by introducing bubbles into the solvent or the cleaning liquid, so that cleaning can be conducted effectively.

In the vaporizer of the present invention, the resilient member is provided to apply a biasing force so as to bias the stack of disks and maintain extremely narrow spaces between the disks. The bias of the resilient member relative to the disks is removed by application of a force against the biasing force by virtue of fluid control. Therefore, it is possible to conduct cleaning of the vaporizer while expanding the spaces between the disks.

What is claimed is:

1. A vaporizer comprising:

disks each including an aperture at a central portion thereof;

a hollow pipe having apertures for permitting radial outflow of a liquid, with said hollow pipe extending through said aperture of each of said discs so as to form a stack of said discs;

a resilient member for applying a biasing force to said discs;

an air supply passage separate from said hollow pipe; and structure for applying a force, to be generated by air supplied through said air supply passage, against the biasing force to thereby remove the biasing force from said discs;

wherein the liquid in said hollow pipe is adapted to be delivered from said apertures to spaces between said discs and vaporized in the spaces between said discs, and when the biasing force is removed from said discs the spaces between said discs are increased in size such that cleaning of said discs can be effectively conducted.

2. The vaporizer according to claim 1, wherein said air supply passage is separate from said hollow pipe by not being in fluid communication with said hollow pipe.

* * * * *